May 16, 1939.  A. L. SWEET  2,158,887
ELECTRICAL SEQUENCING CONTROL
Filed April 30, 1937
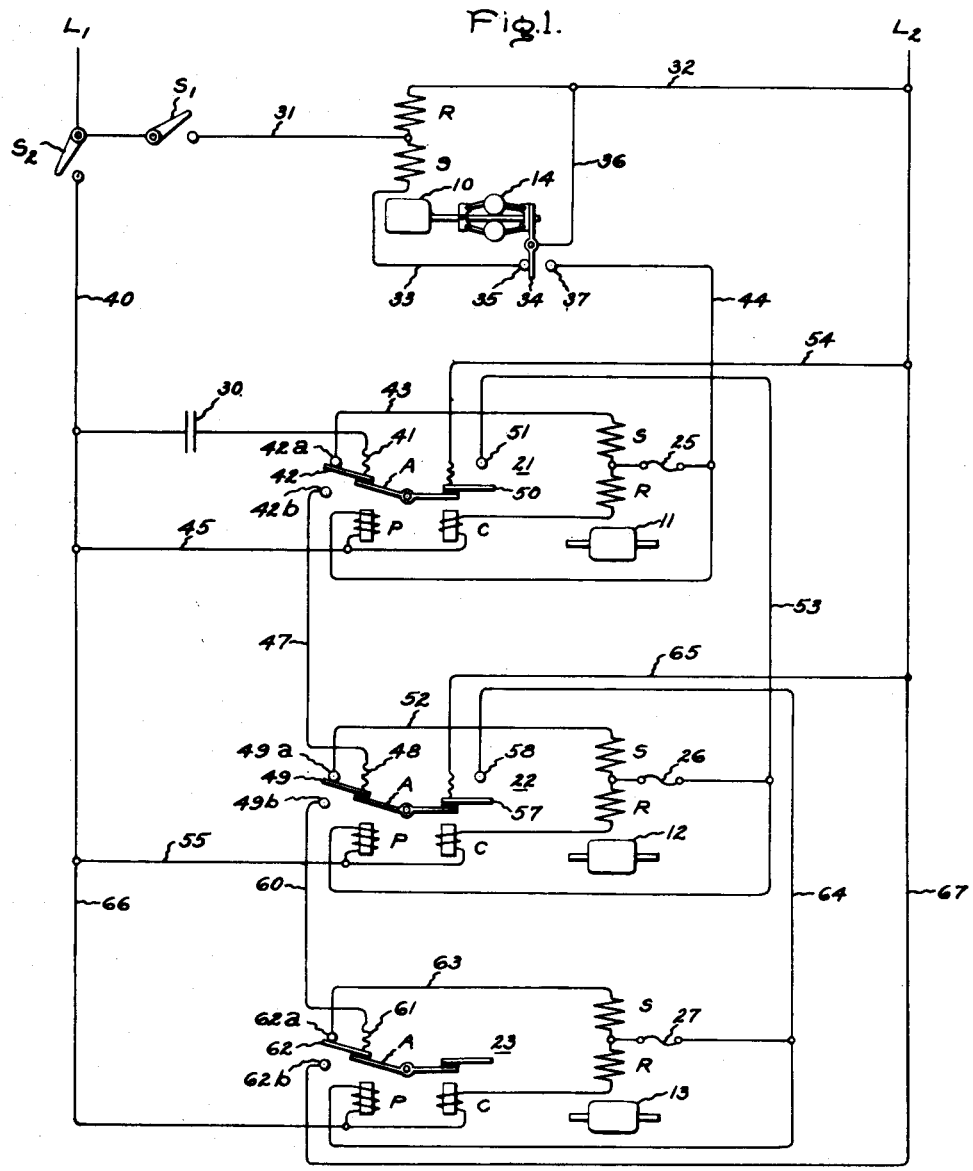
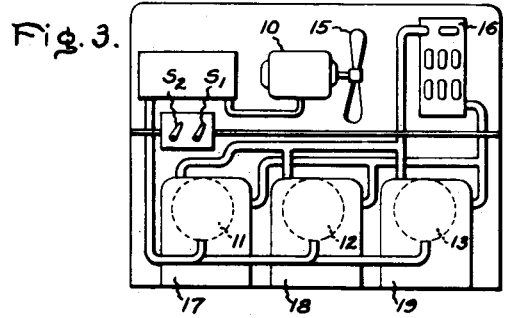
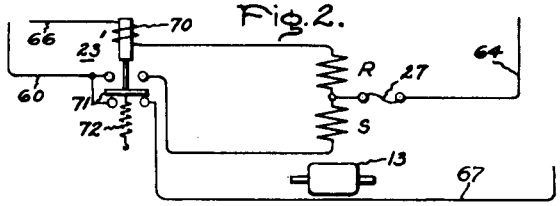
Inventor:
Alva L. Sweet,
by Harry E. Dunham
His Attorney.

Patented May 16, 1939

2,158,887

UNITED STATES PATENT OFFICE 2,158,887

ELECTRICAL SEQUENCING CONTROL

Alva L. Sweet, Schenectady, N. Y., assignor to General Electric Company, a corporation of New York Application April 30, 1937, Serial No. 139,895

9 Claims. (Cl. 172—279)

This invention relates to improvements in sequencing control for electrical devices. While not limited thereto the improvements of the present invention are particularly advantageous in a sequencing control for a plurality of separate electric motor driven devices such as used in air conditioning or other similar work in which the inherent decrease of the energizing current of each device after the initial energization thereof is utilized to provide a time interval before the energization of the next device in the sequence. Such a sequencing control is disclosed and claimed in the patent application, Serial No. 41,578, of Harry R. Crago, filed September 20, 1935, and assigned to the assignee of the present invention.

One of the objects of the present invention is to provide separate overload protection for the sequentially controlled electrical devices without interfering with the sequential control which is normally dependent upon the inherent decrease of the energizing current of each device after the initial energization thereof. Where a number of electric motors are operated automatically in sequence, as in automatic room air conditioning apparatus, it is desirable from the safety standpoint that individual overload protection be provided for each motor to avoid dangerous overheating and burnouts of the motor as well as prevent improper operation of the apparatus. The present invention enables the energizing circuit of any one of the operating motors to be interrupted by its own individual overload protecting device while the remaining motors are still capable of being started in the proper sequence.

A further object of the present invention is to provide an improved sequencing control for a plurality of electric motors of the alternating current split phase condenser starting type wherein a single starting condenser is successively connected in the starting circuit of each of the plurality of motors. The invention also enables the starting condenser to be connected automatically for power factor correction of the supply circuit after all motors have been started.

The improvements of the present invention are particularly useful in room air conditioning apparatus having a plurality of motor driven devices of fairly large current capacity where the total current for all the driving motors must be kept at all times within the maximum permissible current rating of the ordinary domestic electric power supply line. Since the starting current of each motor may become several times greater than the normal running current, the sequential starting of the motors enables the maximum current demand to be limited to a value only slightly greater than the normal current rating of all motors. This avoids the voltage dip that would result from starting all motors at once. Furthermore, the successive connection of the starting condenser with each motor and the subsequent connection of the condenser for line power factor correction also serves to reduce the current demand on the line.

While the present invention is of general application and the principle thereof may be carried out in various ways by those skilled in the art, the best mode in which applicant has applied that principle is illustrated in the accompanying drawing. Fig. 1 is a schematic circuit diagram showing in simplified form an improved electrical sequencing control for a plurality of alternating current condenser motors adapted for air conditioning work; Fig. 2 shows a modification of a part of the control shown in Fig. 1; and Fig. 3 shows schematically an air conditioning apparatus of the room cooling type having the plurality of electric motors operating therein.

As shown diagrammatically in Fig. 1, the present invention is applied to the control of a plurality of split phase capacitor type alternating current motors 11, 12 and 13 which are energized from the supply lines $L_1$, $L_2$ in timed sequence. Each motor has a starting winding S, which is energized only during starting, and a running winding R, which is energized during both starting and running operation. Another straight split phase alternating current motor 10 having a starting winding S and a running winding R is provided with a centrifugal switch mechanism 14 for deenergizing its own starting winding and initiating the sequential operation of the motors 11, 12 and 13 when the switches $S_1$, $S_2$ are closed.

In the air conditioner shown schematically in Fig. 3, the motor 10 drives the fan 15 which circulates air over the finned tube heat exchanger 16. The motors 11, 12 and 13 respectively drive compressor mechanisms which are hermetically sealed within the enclosing casings 17, 18 and 19 and connected to supply a refrigerating medium to the heat exchanger. Preferably the air conditioner shown in Fig. 3 is of the type more fully described in application, Serial No. 79,511, filed May 13, 1936, by Samuel J. Levine and assigned to the assignee of the present invention, although the present invention is not limited in its application to such a device.

The differential relays 21, 22 and 23 which control the sequential starting of the compressor motors 11, 12 and 13 are of the type disclosed in the Crago application mentioned above. Each relay has a current winding C and a potential winding P. The two windings exert opposing magnetic forces upon the essentially pivoted armature A. The armature A is normally biased to the position in which it is shown by means of a suitable weight or spring not shown. The current responsive winding C and the potential winding P are so proportioned that when the motor with which the relay is used is initially energized, the inrush current through the current responsive winding C sets up a magnetic force acting on armature A which preponderates over the magnetic force set up by the potential winding P. As the inrush and accelerating current of the motor decreases when the motor approaches running speed, the magnetic force of the current responsive winding decreases accordingly so that the force of potential winding P then exceeds that of the current responsive winding C. Thereupon the armature A is operated from the position in which it is shown by the preponderant magnetic force of the potential winding P.

In accordance with the present invention, the motors 11, 12 and 13 are provided respectively with overload protective circuit interrupting means 25, 26 and 27 respectively which may consist of a fuse or overload circuit breaker as desired. As will be pointed out more fully hereinafter, the automatic circuit interrupting overload protective means and the sequencing control relay are interconnected with each of the split phase motors in such a manner that the sequential operation is not interfered with in case the overload protective device should open the motor circuit. The overloaded motor simply drops out of the sequence while the other motors operate in the normal manner.

In accordance with the present invention, the single condenser or capacitor 30 is successively connected in circuit with the starting winding of each of the motors 11, 12 and 13 during the starting period of each motor. Furthermore, after all of the motors are running, the condenser or capacitor 30 is then connected in parallel with the running windings of all the motors so as to provide power factor correction and thereby serve to reduce the current demands on the supply lines $L_1$, $L_2$. The condenser 30 may be of any type suitable for connection to the starting windings of the motors.

*Operation*

The principle of the invention will be more readily understood from a description of the operation of the sequencing control shown in Fig. 1 which is as follows: To start operation of the air conditioner shown in Fig. 3, the switches $S_1$, $S_2$ are closed. The closure of switch $S_1$ energizes both the starting and the running windings of motor 10 from the supply lines, $L_1$, $L_2$.

The running winding R of motor 10 is energized through a circuit extending from supply line $L_1$, switch $S_1$, conductor 31, the running winding R and conductor 32 to the supply line $L_2$. The starting winding S of motor 10 is energized through a circuit extending from conductor 31, the winding S, conductor 33, the centrifugal switch 34 in contact with its left-hand contact 35, conductor 36, and thence by conductors 36 and 32 through supply line $L_2$. The centrifugal switch mechanism 14 is so arranged that the switch element 34 is maintained in engagement with contact 35 until the motor 10 is just below its normal operating speed. When the motor 10 reaches full running speed, contact 34 disengages the contact 35 and is operated into engagement with the contact 37.

When the switch element 34 of the centrifugal switch 14 engages contact 37, the fan 15 of the air conditioner is always operating at its normal running speed. Thereupon the sequential starting of the compressor motors 11, 12 and 13 occurs. The motor 11 is first separately energized, the starting winding energizing circuit extending from supply line $L_1$ through control switch $S_2$ conductor 40, condenser 30 which is connected through the lead 41 with the contact 42 which is carried at one end of and suitably insulated from the centrally pivoted armature A of the relay 21 and thence through the upper contact 42a, conductor 43, the starting winding S, the overload protective device 25, conductor 44, switch element 34, conductors 36 and 32 to the supply line $L_2$. At the same time the running winding R of motor 11 is energized, the circuit extending from conductor 40 through conductor 45, the current responsive winding C of relay 21, winding R and thence through the overload protective device 25 and the same energizing circuit as the start winding S. With the motor 11 at standstill, the inrush current through winding C serves to maintain the armature A of relay 21 in the position in which it is shown against the magnetic pull of the potential winding P. The potential winding P of relay 21 is energized in parallel with the circuit including the overload protective device 25, the motor running winding R and the current responsive winding C of the relay. As motor 11 accelerates and reaches approximately running speed, the current through the winding C decreases in value with a corresponding reduction in the magnetic pull exerted on armature A. When the pull of winding C decreases below that of winding P, armature A operates the switch element 42 from its upper contact 42a into engagement with its lower contact 42b. This results in connecting the condenser 30 through the conductor 47 and the lead 48 to the contact 49 of relay 22. At the same time switch element 50 of relay 21 is engaged with its cooperating contact 51 thus completing the energizing circuit for motor 12 after the motor 11 has been accelerated to substantially full running speed.

Motor 12 is started with the condenser 30 connected in series with the starting winding S thereof, the circuit extending from the conductor 40 through condenser 30, flexible lead 41, switch element 42 and contact 42b of relay 21, conductor 47, conductor 48, switch element 49 and contact 49a of relay 22, conductor 52, the start winding S of motor 12, the overload conductive device 26 and thence through conductor 53, contact 51 and switch element 50, and conductor 54 to the supply line $L_2$. The running winding of motor 12 is energized from the conductor 40 through conductor 55, the current responsive winding C of relay 22, the running winding R and thence through the overload protective device 26 and thence through the same circuit to $L_2$ as traced for the starting winding S. The operation of relay 22 during the starting of motor 12 is exactly the same as the operation of relay 21 during the starting of motor 11. The armature A of relay 22 is maintained in the position as shown by the pull of current responsive winding C until the motor 12 has accelerated and reached substantially running speed. This maintains the condenser 30 connected in circuit with the start winding S of motor 12 during the starting period. When motor 12 has reached running speed, the armature A disengages its switch element 49 from the upper contact 49a cooperating therewith and brings switch element 49 into engagement with its lower contact 49b. This results in connecting the condenser 30 in circuit with the starting winding S of motor 13. At the same time switch element 57 of relay 22 engages its contact 58 to complete an energizing circuit for motor 13.

Thus motor 13 is started after motor 12 has been accelerated and reached substantially running speed. The energizing circuit for the starting winding S of motor 13 extends from conductor 40 through the condenser 30, and the flexible lead 41 and contacts 42 and 42b of relay 21, conductor 47, flexible lead 48 and contacts 49 and 49b of relay 22, conductor 60, lead 61 and contacts 62 and 62a of relay 23, conductor 63 and thence through the start winding S of motor 13, the overload protective device 27, conductor 64, contacts 57 and 58 of relay 22, and conductor 65 to supply line L₂. The energizing circuit for the running winding R of motor 13 extends from conductor 40 through conductor 66, the winding C of relay 23, the running winding R of motor 13, and thence through the overload protective device 27, and the same circuit to L₂ as just traced for the starting winding S.

In starting motor 13, the relay 23 operates in exactly the same manner as relays 22 and 21 previously described. The armature A of relay 23 remains in the position in which it is shown until the motor is accelerated and reaches substantially running speed. Then the armature disengages switch element 62 from the upper contact 62a cooperating therewith, thereby deenergizing the start winding S. At the same time contact 62 is operated into engagement with the lower contact 62b cooperating therewith. This connects the condenser 30 through the conductor 67 directly between the supply lines L₁, L₂, the circuit extending through the contacts 42 and 42b, 49 and 49b and 62 and 62b of the relays as previously traced. This connection of the condenser 30 between the supply lines L₁, L₂ serves to provide power factor correction for the motor energizing circuits and thereby materially reduces the out of phase current produced by the motors 10, 11, 12, 13.

The present invention enables the motors 11, 12 and 13 to be started in sequence even though one of the overload protective devices 25, 26 and 27 should operate to interrupt the circuit of the corresponding motor. For example, assume that motor 11 from some cause becomes overloaded or stalled to an extent sufficient to cause the overload protective device 26 to interrupt the circuit. Under these conditions when the switch element 34 of the centrifugal switch mechanism engages contact 37, only potential winding P of relay 21 is energized, the circuit through the current responsive winding C being interrupted by the circuit interrupting means 26. The armature A of the relay 21 hence is not maintained in the position in which it is shown by the current responsive winding C but is immediately operated by the potential winding P to engage the switch element 42 with its lower contact 42b and the switch element 50 with the contact 51. As a result motor 11 simply drops out of the sequence and motor 12 is started in its normal manner. This result is due to the fact that the potential winding P is connected in shunt with the circuit including the motor running winding R and the overload protective device for the motor.

While only three motors have been shown in the sequential starting arrangement, it will be evident that the series may be extended to include any additional number desired by simply adding more motors and relays of the type indicated with the overload connections similar to those shown in Fig. 1. Also if desired, the centrifugal switch mechanism 14 can be replaced by a differential relay of the type shown and connections made to connect the condenser 30 in series with the starting winding S. However, the centrifugal switch mechanism 14 is preferable as it effectively insures that the fan 15 is at normal running speed before any of the compressor motors can be operated.

If desired, the switch S₂ may be opened and the motor 10 energized alone to drive the air circulating fan 15 by closure of switch S₁.

Fig. 2 shows a modified form of relay which may be used with the last motor in the series if desired instead of the differential type of relay used with the other motor. As shown in Fig. 2 the relay 23' has only a single current responsive winding 70 which is connected in series circuit with the motor running winding R. The relay contact 71 is normally biased to its lower position by the spring 72. Thus when the motor 13 is energized in the manner previously described, the relay contact 71 is raised by the pull of winding 70 against biasing spring 72 to connect the condenser 30 in series with the motor starting winding S. As soon as the inrush current through the running winding circuit is decreased to the normal running value, contact 71 is returned to its lower position thereby connecting the condenser 30 through the conductors 60 and 67 directly between the supply lines L₁, L₂ in a manner equivalent to that previously described.

What I claim as new and desire to secure by Letters Patent of the United States is:

1. In combination, a plurality of electric motors, each having a starting winding and a running winding, a common starting condenser for said motors, means for energizing said motors in sequence, including a plurality of electroresponsive devices, each for separately connecting said condenser in series circuit with the starting winding of a corresponding motor only during the starting period thereof and thereafter opening said circuit, and connections jointly controlled by said electroresponsive devices whereby said condenser is connected in parallel circuit with the running windings of said motors after the sequential starting thereof.

2. In combination, a plurality of electric motors each having a starting winding and a running winding, means for energizing said motors including a plurality of differential electroresponsive switching devices, each having a series winding and a potential winding connected respectively in series and in shunt with the running winding of a corresponding motor, connections controlled by said devices for energizing said motors in sequence and for deenergizing the starting winding of each motor after the starting thereof, a common starting condenser for said motors, and connections controlled by said devices for connecting said condenser in separate series circuit with the starting winding of each motor only during the starting period thereof.

3. In combination, a plurality of electric motors each having a starting winding and a running winding, means for energizing said motors including a plurality of differential electroresponsive switching devices, each having a series winding and a potential winding connected respectively in series and in shunt with the running winding of a corresponding motor, connections controlled by said devices for energizing said motors in sequence and for deenergizing the starting winding of each motor after the starting thereof, a common starting condenser for said motor, electrical connections controlled by said devices for connecting said condenser in separate series circuit with the starting winding of each motor only during the starting period thereof and electrical connections controlled by said devices for connecting said condenser in parallel circuit with the running winding of said motors after the sequential starting thereof.

4. In an electrical sequencing system, the combination of a plurality of electrically energized devices, at least one thereof having the energizing current thereof decreasing after the initial energization thereof, means operable for separately energizing said one device, automatic means connected in series circuit with said device and operable for deenergizing said device upon the occurrence of overload current therein, an electroresponsive switch having differential windings, one connected to be responsive to the energizing current of said one device and the other connected in shunt with said series circuit and cooperating to effect operation of said switch both upon decrease of the energizing current of said one device and upon operation of said energizing means irrespective of operation of said automatic means, and circuit connections controlled by said electroresponsive switch for energizing another of said electrical devices upon operation of said switch.

5. In an electrical sequencing system, the combination of a series of electrically energized devices, at least one of said devices having an energizing winding wherein the initial energizing current is greater than the normal running current and having automatic circuit interrupting overload protective means connected in series circuit with said winding, means for energizing said one device, and a differential electroresponsive circuit controlling device having a current responsive winding connected in series circuit with the said energizing winding and having a potential winding connected in shunt with said series circuit including said winding and said overload protective means therefor and having contact mechanism for energizing the succeeding device in the series when the magnetic force set up by said potential winding exceeds the magnetic force set up by said current responsive winding irrespective of the operation of said overload protective means.

6. In an electrical sequencing system, the combination of a plurality of electric motors, each having a starting and a running winding and having the energizing current of the running winding thereof decreasing to a normal running value after the starting of the motor, means operative for separately energizing said one motor, an automatic overload circuit interrupting means connected in series circuit with both the starting and the running windings of said one motor for deenergizing said windings upon the occurrence of overload current therein, an electroresponsive switch having differential windings, one connected in series circuit with the running winding of said one motor and the other connected in shunt with said series circuit and cooperating to effect operation of said switch both upon a predetermined decrease of the energizing current of said running winding and upon operation of said energizing means irrespective of operation of said automatic circuit interrupting means, and connections controlled by said electroresponsive switch for energizing another of said motors upon operation of said switch.

7. In combination, a plurality of electric motors, each having a starting winding and a running winding, a common starting condenser for said motors, and automatic switching means having concatenated circuit connections for sequentially energizing said motors with the starting winding of each motor energized only during the starting thereof in separate series circuit with said condenser.

8. In combination, a plurality of electric motors, each having a starting winding and a running winding, a common starting condenser for said motors, and means for sequentially energizing said motors including electroresponsive switching means having circuit connections for energizing said condenser in separate series circuit with the starting winding of each one of said motors only during the starting thereof and for deenergizing the starting winding of each motor after the starting thereof.

9. In a sequential motor starting system, the combination with a motor having a running winding and a starting winding, means for energizing the windings of said motor including a centrifugal switch mechanism for energizing the starting winding during the starting of the motor and for deenergizing said starting winding when said motor has attained a predetermined speed, and a second motor having windings connected with said centrifugal switch mechanism to be energized upon operation of said switch mechanism to deenergize the starting winding of said first motor.

ALVA L. SWEET.